US008882009B2

(12) United States Patent
Walther et al.

(10) Patent No.: US 8,882,009 B2
(45) Date of Patent: Nov. 11, 2014

(54) FORMING DISC FOR FOOD PROCESSING

(75) Inventors: Heiko Walther, Reer (DE); Christoph Thelen, Verden (DE); Alexander Fahnenspiel, Verden (DE)

(73) Assignee: Vemag Maschinenbau GmbH, Verden/Aller (DE)

(*) Notice: Subject to any disclaimer, the term of this patent is extended or adjusted under 35 U.S.C. 154(b) by 0 days.

(21) Appl. No.: 13/448,895

(22) Filed: Apr. 17, 2012

(65) Prior Publication Data

US 2012/0261501 A1 Oct. 18, 2012

(30) Foreign Application Priority Data

Apr. 18, 2011 (DE) ..................... 20 2011 005 356 U

(51) Int. Cl.
*A47J 19/00* (2006.01)
*B02C 18/36* (2006.01)
*B02C 18/30* (2006.01)

(52) U.S. Cl.
CPC ............. *B02C 18/365* (2013.01); *B02C 18/302* (2013.01)
USPC ........................................... 241/86; 241/82.1

(58) Field of Classification Search
CPC ...... A47J 19/005; B02C 13/282; B02C 13/00
USPC ......................................... 241/86, 82.1–82.7
See application file for complete search history.

(56) References Cited

U.S. PATENT DOCUMENTS

| | | | | |
|---|---|---|---|---|
| 2,042,161 | A * | 5/1936 | Satzinger | 241/82.3 |
| 2,528,381 | A * | 10/1950 | Mantelet | 241/273.2 |
| 2,967,555 | A * | 1/1961 | Baker | 241/82.5 |
| 3,934,827 | A * | 1/1976 | Seydelmann | 241/84 |
| 4,004,742 | A * | 1/1977 | Hess | 241/82.5 |
| 4,153,208 | A * | 5/1979 | Vomhof et al. | 241/82.4 |
| 4,699,325 | A * | 10/1987 | Hess | 241/82.5 |
| 6,485,770 | B2 * | 11/2002 | McIsaac et al. | 426/512 |
| 6,651,915 | B2 * | 11/2003 | Staudenrausch | 241/82.5 |

FOREIGN PATENT DOCUMENTS

| | | | |
|---|---|---|---|
| DE | 2344284 | A1 | 3/1975 |
| DE | 2649305 | A1 | 8/1977 |
| DE | 20101396 | U1 | 6/2002 |
| DE | 102007002803 | A1 | 7/2008 |
| FR | 326814 | A | 6/1903 |
| RU | 2184613 | C2 | 7/2002 |

* cited by examiner

*Primary Examiner* — Faye Francis
*Assistant Examiner* — Onekki Jolly
(74) *Attorney, Agent, or Firm* — Wood, Herron & Evans LLP

(57) ABSTRACT

A forming disk apparatus for processing foodstuff product that includes a plurality of holes that open into a portion of an axial side surface of the forming disk. A depression is also provided eccentrically in the side surface of the forming disk and positioned concentrically relative to the forming disk. A cutting apparatus is arranged to bear against an axial side surface of the forming disk such that the cutting apparatus is movable relative to the forming disk apparatus.

14 Claims, 6 Drawing Sheets

FORMING DISC FOR FOOD PROCESSING

TECHNICAL FIELD

The invention concerns a forming disk for processing foodstuff products and a cutting apparatus having the forming disk according to the invention.

BACKGROUND

Forming disks are known from the meat industry as being used for the production of chopped or minced foodstuffs, in particular minced meat. For that purpose the forming disks have a multiplicity of through holes, through which the foodstuffs are pressed. Disposed adjacent to the forming disk is a rotating blade which comminutes the foodstuffs and for that purpose co-operates with the through holes. Patent RU 2 184 613 T2 discloses a round apertured disk for mincing purposes, comprising a plurality of through holes arranged in a concentric arrangement over the entire surface of the forming disk. The forming disk further has two blind holes for intermediate storage of the meat material to be processed.

DE 201 01 396 U1 discloses a mincing disk in which a multiplicity of holes are arranged on a face of the disk exclusively within a hole-bearing region on the surface of the disk.

The area of use of the forming disk differs from that of the apertured disk for mincing purposes in that the conveyed product is only portioned, formed and possibly homogenized, but not comminuted. In addition the 'comminution holes' in the case of mincing disks are generally distributed over the entire surface of the disk.

Each of the above disks for mincing suffers from the disadvantage that a blade rotating thereagainst bears completely against the disk surface outside the holes. That leads to friction of the blade against the forming disk and thereby results in wear. The blade becomes blunt more quickly and has to be more frequently reground.

Therefore the object of the invention is to provide a forming disk, which reduces the wear by a cutting device cooperating with the forming disk.

SUMMARY

The object is attained by means of a forming disk of the kind set forth in the opening part of this specification, in which a depression is provided eccentrically in the side surface.

In one embodiment, the forming disk according to the invention advantageously reduces the friction between a cutting device and the forming disk in the region of a depression provided eccentrically in the side surface. A cutting device is movable against the side surface in contact-free relationship in the region of the depression. The depression extends along the path of movement of a cutting device. The depression occupies a portion on the side surface of the forming disk, which does not overlap with the center point of the forming disk.

In one advantageous embodiment of the forming disk, according to the invention, the depression is of an elongate configuration. In this embodiment, the depression has side lengths of differing sizes. The elongate shape of the depression permits particularly good adaptability of the depression to the path of movement of the cutting edge of a cutting device. An elongate depression is particularly variable with respect to its configuration and makes it possible for a region of the side surface, that is as large as possible, to be in the form of a depression.

A particularly preferred embodiment of the forming disk according to the invention is one in which the forming disk is circular and the depression is in the shape of a circular arc. With circular forming disks, the depression in the shape of a circular arc affords particularly good adaptability of the depression for reducing the frictional area between the forming disk and a rotating cutting device.

An advantageous development of the forming disk according to the invention is characterized in that the depression is arranged concentrically relative to the forming disk. The concentric arrangement provides a region which is the same as that of the cutting device rotating about the central axis of the forming disk. Thus, the concentric arrangement is always movable with a low degree of contact against the side surface of the forming disk.

A further embodiment of the forming disk according to the invention has a depression which is adjacent to the portion having the holes and in that way provides that the frictional surfaces of a cutting device are minimized in the region between the depression and that portion. The spacing between the depression and that portion is as small as possible-in this embodiment.

According to another advantageous embodiment, the width of the portion of the forming disk according to the invention has holes less than or equal to the width of the depression. These holes ensure that a part or portion of a cutting device, which is cuttingly-operative and co-operates with the holes in the portion having those holes for processing the foodstuff products, is not subjected to any wear in the region of the depression.

It is further preferred that the forming disk according to the invention is designed such that at least a surface portion of the depression, which is adjacent to the portion having the holes, is in the form of a stepless transitional surface to the side surface. The transitional surface prevents an abrupt transition between the depression and the side surface of the forming disk. Impacting of a cutting device against an edge of the depression is very substantially prevented in that way.

Another advantageous embodiment of the forming disk according to the invention is one in which the side surface of the forming disk at the edge region does not have a depression, which offers a contact surface for a cutting device. The edge region is usually of such dimensions such that only a part of a cutting device, that is not cuttingly operative, comes to bear thereagainst.

It is also advantageous if the portion having the holes is substantially in the shape of a circular arc. In that way, the forming disk can be designed for a rotating cutting device in a particularly wear-reducing configuration.

Another advantageous embodiment of the forming disk according to the invention is one in which the holes are arranged in a plurality of adjacent groups within the portion, thereby permitting the portion to be of a variable configuration. This configuration also makes it possible to achieve different portioning effects for the foodstuff products.

A further advantageous embodiment of the forming disk according to the invention is characterized in that the ratio between the radius of the forming disk and the width of the depression in the radial direction is in the range of between 1.25:1 and 2.75:1 and preferably in a range of between 1.75:1 and 2.5:1. This embodiment allows particularly advantageous dimensioning of the depression and the contact surfaces for a cutting device.

A second aspect of the invention concerns a cutting apparatus for processing foodstuff products. The cutting apparatus may include the forming disk according to one of the foregoing embodiments and a cutting device which is arranged to bear against the axial side surface of the forming disk. The cutting device is movable relative to the forming disk.

The cutting apparatus, in accordance with an embodiment of the invention, permits an increase in the service life and lower maintenance costs for the cutting device, by virtue of the lower level of wear of the cutting device against the forming disk. Preferably, the cutting device is rotatable; however, it would also be possible to envisage cutting devices which are movable along non-circular paths of movement, for example straight, quadrangular, elliptical, etc. paths of movement.

A particularly advantageous embodiment of the cutting apparatus is one in which the transitional surface has an edge line relative to the side surface that extends inclinedly to the direction of movement of the cutting device. Thereby, the cutting device is movable with a particularly low level of wear over the edge line.

A further advantageous embodiment of the cutting apparatus according to the invention is one in which the cutting device has a plurality of ribs with cutting edges. In that way, the cutting device is stable yet movable on the forming disk and increases the processing capability of the cutting device.

A preferred embodiment of the cutting apparatus in this respect is one in which the ribs are connected together by means of at least one reinforcing member, wherein the reinforcing member is preferably circular or shaped in the form of a circular arc. Bending or oscillation of the ribs can be effectively reduced in that way.

Another advantageous embodiment of the cutting apparatus, according to the invention, is one which-also includes a housing having an inlet and an outlet, and a conveyor means for conveying the foodstuff products to the outlet, wherein the forming disk is arranged at the outlet and is adapted to fill the cross-section of the outlet.

BRIEF DESCRIPTION OF THE DRAWINGS

The invention is described in greater detail hereinafter by means of embodiments by way of example.

DETAILED DESCRIPTION

Figures 1, 2, 3:
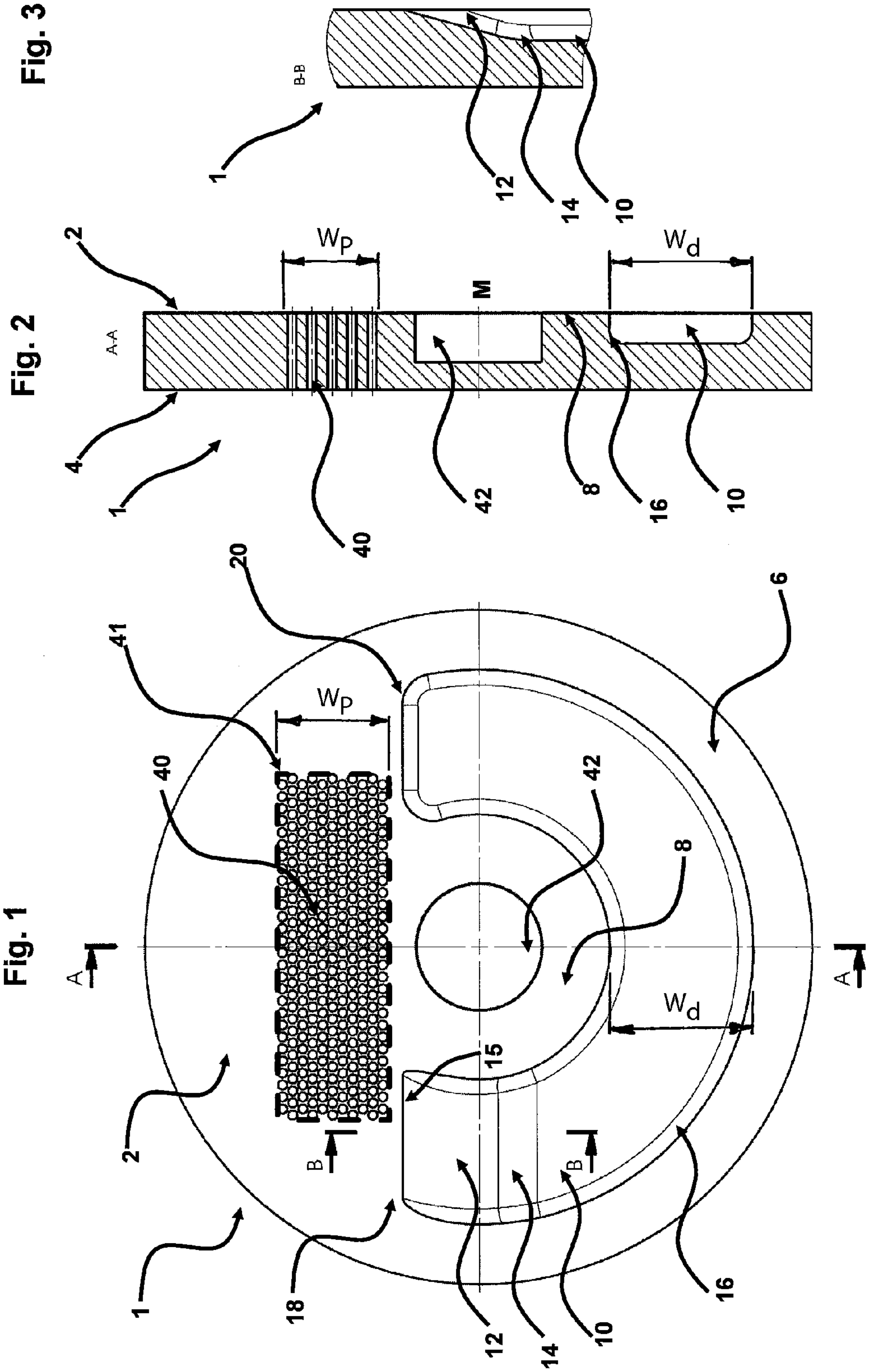
FIG. 1 is a plan view of a first embodiment of the forming disk.
FIG. 2 is a cross-sectional side view of the first embodiment along section line A-A of FIG. 1.
FIG. 3 is a partial cross-sectional side view of the first embodiment along section line B-B of FIG. 1.

FIGS. 1 through 3 show a first embodiment of the forming disk 1 apparatus. The forming disk 1 has a plurality of holes 40, in the form of through holes 40, for processing foodstuff products, which open into a portion 41 of an axial side surface 2 of the forming disk 1. A depression 10 is provided eccentrically in the axial side surface 2. The portion 41 occupies only a fraction of the total disk surface, preferably less than half, and particularly preferably occupies less than a third of the overall surface area. The portion 41 is arranged radially substantially at the same level as the depression 10.

The forming disk 1 is of a circular configuration. The forming disk 1 is preferably made from a metallic material, for example high-quality steel. It would also be possible to envisage rectangular, polygonal, elliptical or other basic shapes for the forming disk 1. As shown in FIG. 1, the forming disk 1 has a mounting device 42. The mounting device 42 is in the form of a blind bore 42. The axial side surface 2 of the forming disk 1 functions as the entry side surface for the foodstuff products to be processed. A second axial side surface 4, which is opposite the entry side surface 2, functions as the exit side surface 4 of the forming disk 1.

Figure 5:
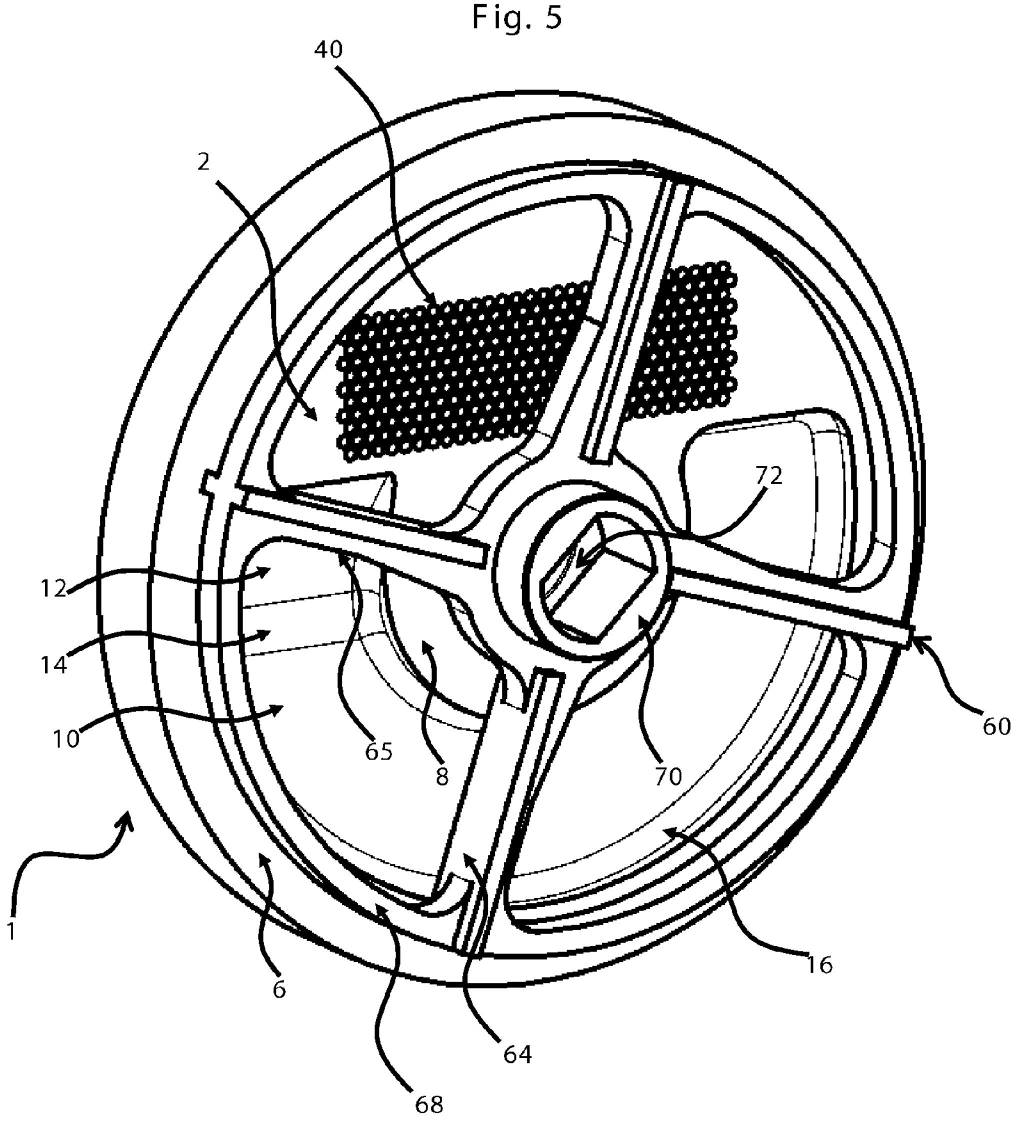
FIG. 5 is a perspective view of a first embodiment of the cutting apparatus.
Figure 6:
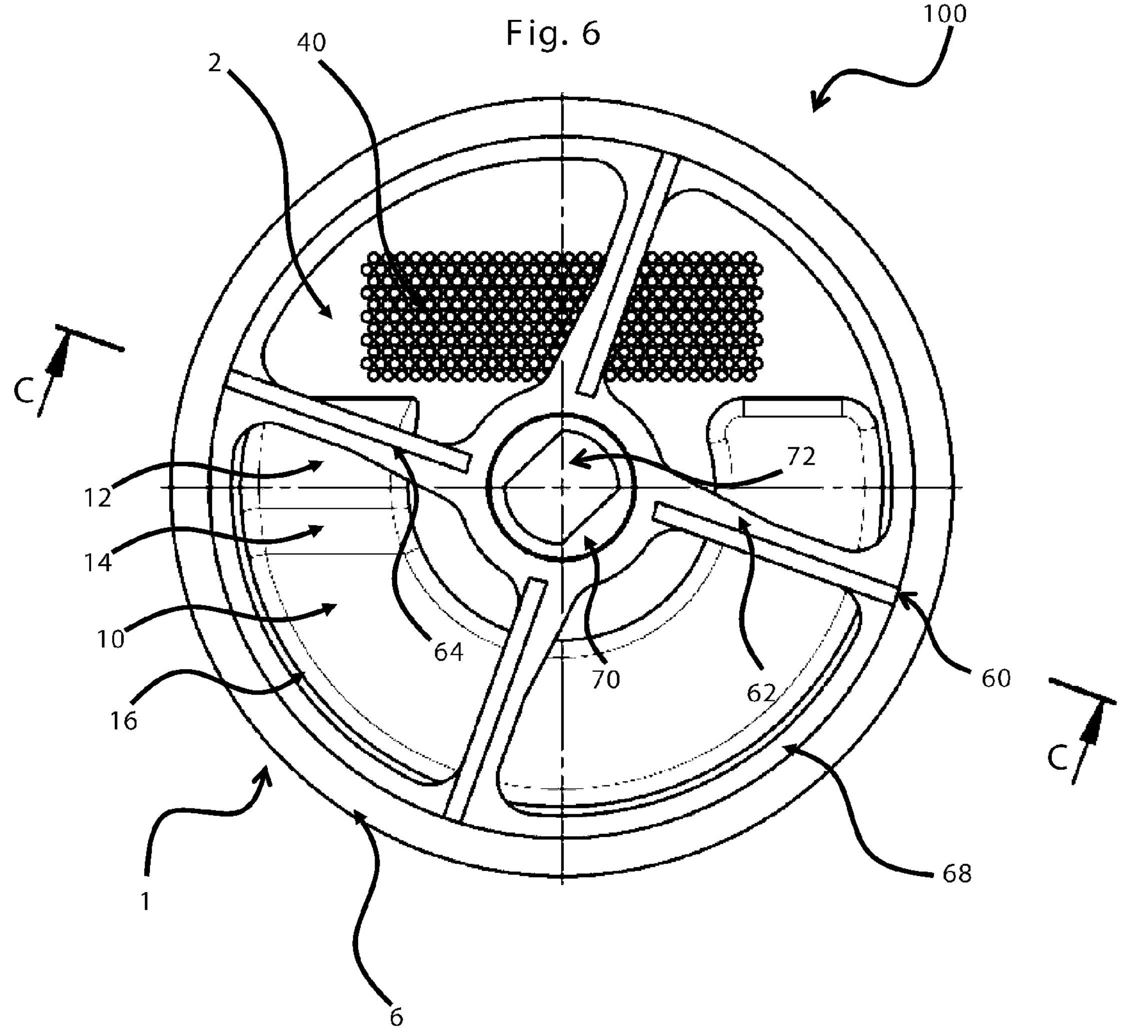
FIG. 6 is a plan view of the first embodiment of the cutting apparatus.

The blind bore 42 serves to receive a cutting device 60 and/or a bearing and drive shaft for the cutting device 60 as shown in FIG. 5. The cutting device 60 is, for example, in the form of a rotating blade disk 60, as shown in FIG. 5. Other variants however would also be conceivable for receiving the cutting device 60. For example, a projection protruding axially from the side surface 2 or a bearing shaft formed integrally with the forming disk 1 may be used for receiving the cutting device 6. The blind bore 42 is oriented concentrically in relation to the central axis 43 of the forming disk 1. Disposed between the blind bore 42 and the depression 10 is an inner contact surface 8 for the cutting device 60. The depth of the blind bore 42 in the first embodiment is about two thirds of the thickness of the forming disk 1.

The depression 10 is in the form of a circular arc and is of a substantially rectangular cross-sectional profile. Depending on the respective shape of the forming disk 1, it would also be possible to envisage depressions 10 of an elongate configuration. The width $W_d$ of the depression 10 in the radial direction is about half the radius of the forming disk 1. The shape of the depression 10 is thus also equal to a part of an annular disk or a flat torus. The ratio between the radius of the forming disk 1 and the width $W_d$ of the depression 10 in the radial direction could alternatively be in the range of between 1.25:1 and 2.75:1. The depression 10 is arranged concentrically relative to the central axis 43 of the forming disk 1, and an outer contact surface 6 is provided between the depression 10 and the outer edge of the entry side surface 2. In the first embodiment, the depression 10 is arranged such that the spacing of the depression 10 relative to the blind bore 42 and the outside edge of the entry side surface 2 or the width of the inner and outer contact surfaces 8, 6 in the radial direction is approximately equal. The depth of the depression 10 in the first embodiment is about half the thickness of the forming disk 1.

The depression 10 is milled. Other methods of manufacture would also be conceivable, depending on the respective depth of the depression 10.

A surface portion 12 of the depression 10, which is adjacent to the through holes 40 or the portion 41, is in the form of a stepless transitional surface 12 to the entry side surface 2. The surface portion 12 is at an end 18 of the depression 10. As shown in FIG. 1, in this embodiment, only the surface portion 12 at the left-hand end 18 of the depression 10 is in the form of a transitional surface. At the second end 20 of the depression 10, on the right-hand side in FIG. 1, the depression 10 drops away perpendicularly from the entry surface. With a cutting device rotating in the clockwise direction, the second end 20 would represent the arrival end of the cutting device and the first end 18 would represent the departure end. Alternatively, both ends 18, 20 of the depression 10 could also be provided with a transitional surface 12. As shown on an enlarged scale in FIG. 3, the transitional surface 12 extends inclinedly from the entry side surface 2 into the depression 10 and has a rounded edge 14 to the flat portion of the depression 10. The transition between the transitional surface 12 and the entry side surface 2 is progressive. The edge line 15 of the transitional surface 12 to the entry surface does not have an edge. In the embodiment of FIG. 1, the edge line 15 extends transversely relative to the radial direction of the forming disk 1. Therefore, the edge line 15 extends inclinedly relative to the cutting device 60, which rotates with respect to the forming disk 1, and prevents contact between a large part of the edge line 15 and the cutting device 60. FIGS. 1 and 2 also show that the inner edges or corners 16 of the depression 10 are rounded to prevent depositing and clogging of foodstuff products in the corners 16 and improve removal thereof.

As shown in FIG. 2, the through holes 40 are provided for the processing of foodstuff products and open into the portion 41 on the entry side surface 2. The through holes 40 have a diameter of a few millimeters and extend axially through the forming disk 1 to open into a further portion on the exit side surface 4, as shown in FIG. 2.

In the first embodiment, the portion 41 is of a rectangular shape. The portion 41 is adjacent to the ends 18, 20 of the depression 10. The width $W_p$ of the portion 41 is less than the width $W_d$ of the depression 10 in the radial direction. It would also be conceivable for the width $W_p$ of the portion 41 to be of a dimension corresponding to the width $W_d$ of the depression 10 in the radial direction. The through holes 40 are closely arranged in a mutually adjacent relationship within the portion 41. As shown in FIG. 1, the edges of the through holes 40 approximately touch. The through holes 40 are further arranged in rows, with the rows being arranged in alternately mutually displaced relationship. More particularly, at least one of the through holes 40 lies between two other through holes 40, each being of the adjacent rows.

Figure 4:
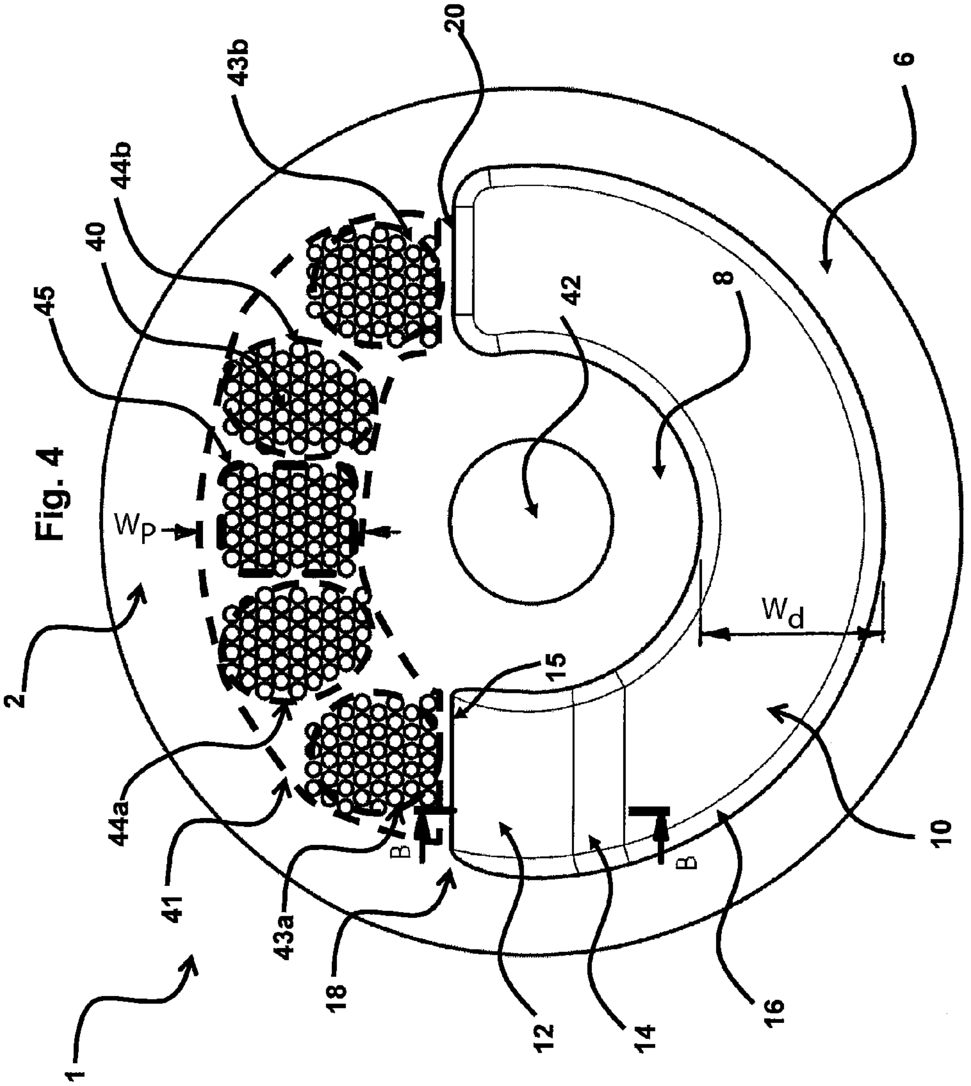
FIG. 4 is a plan view of a second embodiment of the forming disk.

FIG. 4 shows a second embodiment of the forming disk 1 with a different arrangement of the through holes 40. The through holes 40 are arranged in a plurality of adjacent groups 43*a*, 43*b*, 44*a*, 44*b*, 45 within the portion 41, wherein the portion 41 has the through holes 40 substantially in the shape of a circular arc. Some of the groups 43*a*, 43*b* are circular while other groups 44*a*, 44*b* are elliptical. Another group 45 is rectangular. The arrangement of the groups 43, 43*b*, 44*a*, 44*b*, 45 within the portion 41 is symmetrical relative to each other about an axis. The width of the portion 41 substantially corresponds to the width $W_d$ of the depression 10 in the radial direction and adjoins the ends 18, 20 of the depression 10. The region that the depression 10 and the portion 41 of the through holes 40 on the entry side surface 2 occupy corresponds to the shape of an annular disk. The annular disk shape and arrangement of the depression 10 and the portion 41 is particularly advantageous when using the forming disk 1 in combination with the rotating blade disk 60.

FIG. 5 shows a first embodiment of a cutting apparatus 10 having a forming disk 1 according to the first embodiment and a cutting device 60 which is arranged to bear against the axial side surface 2 or the entry side surface of the forming disk 1 and is movable relative thereto.

The cutting disk 60 is of a rim-shaped structure having a plurality of ribs 62. The ribs 62 are connected together by means of a circular reinforcing member 68 and a hub 70. Preferably, the cutting device 60 is made in one piece. The ribs 62 are made up of a parallelepipedic knife 64 and a stiffening means 65; however, knives having a different structure would also be conceivable. The contact surface of the parallelepipedic knife 64 has a cutting edge 66, which bears against the entry side surface 2 of the forming disk 1. In addition, the length of the knife 64 is greater than the width $W_d$ of the depression 10 in the radial direction, and a part of the knife 64 bears against the entry side surface 2 on the inner and outer contact surfaces 8, 6 to ensure stable contact for the blade disk 60. Furthermore, the length of the knife 64 is also less than the radius of the forming disk 1 to prevent the knife 64 from projecting outside the forming disk 1.

Figure 7:
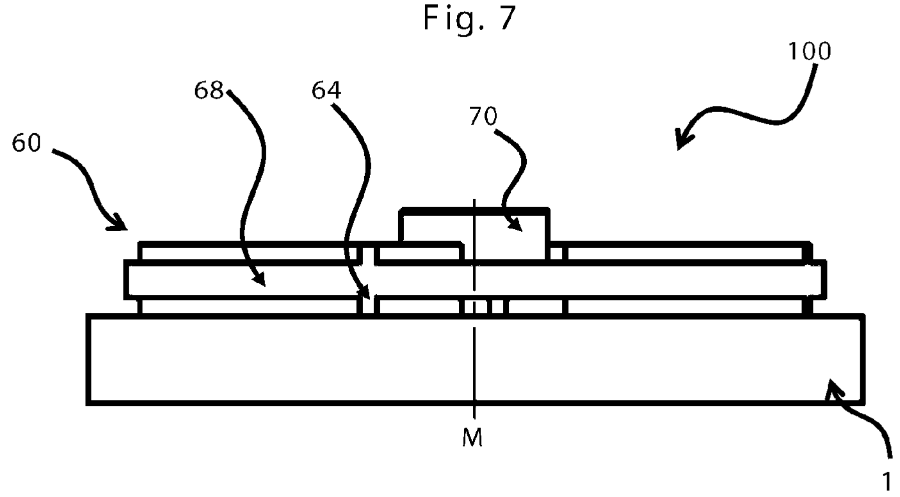
FIG. 7 is a side view of the first embodiment of the cutting apparatus.

The stiffening means 65 is disposed at the mid-height position of the knife 64 and does not come into contact with the forming disk 1. The stiffening means 65 is also disposed behind the knife 64 considered in the clockwise direction relative to the direction of rotation of the cutting device 60. The ribs 62 are arranged at the same angle relative to each other. In this embodiment, the four ribs 62 are respectively arranged at an angle of 90° relative to each other. Cutting devices 60 with a greater or smaller number of ribs 62 would also be conceivable. The ribs 62 are connected together by means of a reinforcing member 68, which has a circular shape. The reinforcing member 68 is respectively connected to the outer ends of the ribs 62 in the radial direction. As shown in FIG. 7, the reinforcing member 68 is arranged at the mid-height position of the knives 64 in one piece with the reinforcing means 65.

Figure 8:
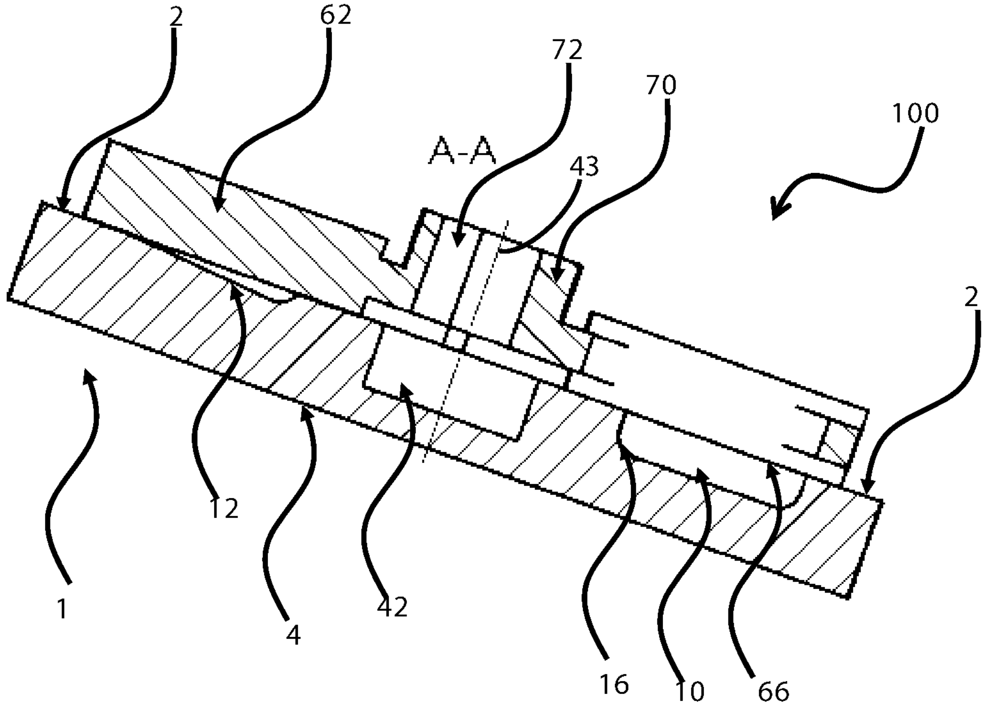
FIG. 8 is a cross-sectional side view of the first embodiment of the cutting apparatus along section line C-C of FIG. 6.

The cutting device 60 is rotatably mounted to the forming disk 1 by means of a bearing (not shown) and drive shaft (not shown). For that purpose, the bearing and drive shaft are connected in a positively locking relationship to the hub 70 of the cutting device 60 and the blind bore 42 in the forming disk 1. The hub 70 has an opening 72 to receive the bearing and drive shaft. The cutting device 60 is oriented concentrically relative to the forming disk 1. As shown in FIGS. 7 and 8, the hub 70 is greater in height than the knife 64 to provide for a higher degree of rotational stiffness for the hub 70.

Figure 9:
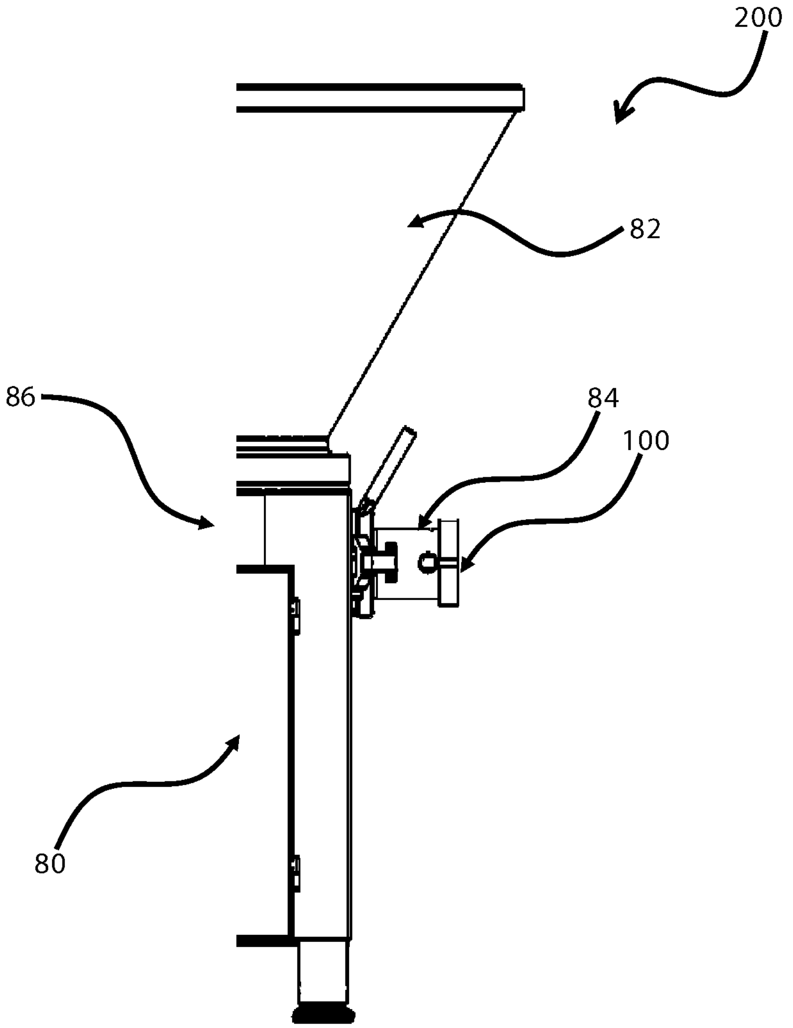
FIG. 9 is a side view of a second embodiment of the cutting apparatus.

FIG. 9 shows a second embodiment of the cutting apparatus 200 including a housing 80 having an inlet 82 and an outlet 84, and a conveyor means 86 for conveying the foodstuff products to the outlet 84, as well as the cutting apparatus 100 in accordance with the first embodiment. The inlet 82 is in the form of a hopper which optionally can be provided with a plurality of screws for conveying and mixing the foodstuff products. The forming disk 1 is arranged at the outlet 84 and is adapted to fill the cross-section of the outlet 84.

A combination of the first embodiment of the cutting apparatus 100 with an apparatus for conveying and processing foodstuffs in accordance with DE 10 2008 013 393 would also be conceivable.

For processing foodstuff products, the cutting device 60 is rotated by means of the drive shaft relative to the forming disk 1. The conveyor means 86 conveys the foodstuff products into the through holes 40 such that the cutting device 60 chops the foodstuffs into small pieces as soon as the foodstuffs pass through the through holes 40. A cuttingly operative part or portion of the knife 64 is disposed outside the portion 41 over the depression 10 so that contact between that part of the knife 64 and the forming disk 1 does not occur. Thereby, the cutting edge 66 is prevented from becoming blunt away from the portion 41.

The invention claimed is:

1. An apparatus for processing a foodstuff product, the apparatus comprising;

a circular forming disk having a side surface, a central axis extending through the side surface, a plurality of holes opening into a portion of the side surface, and a depression eccentrically provided in the side surface relative to the central axis, the plurality of holes configured for processing the foodstuff product, and the depression having an arc shape that is entirely concentrically arranged with the side surface of the circular forming disk, wherein a width of the portion of the side surface in a radial direction is less than or corresponds to a width of the depression in the radial direction.

2. The apparatus of claim 1 wherein the depression is elongate.

3. The apparatus of claim 1 wherein the depression is positioned adjacent to the portion of the side surface having the plurality of holes.

4. The apparatus of claim 1 wherein the depression has at least one stepless transitional surface adjacent to the portion of the side surface.

5. The apparatus of claim 1 wherein the side surface has an edge region that does not have the depression.

6. The apparatus of claim 1 wherein the portion of the side surface is substantially shaped as a circular arc.

7. The apparatus of claim 1 wherein the plurality of holes is arranged in a plurality of adjacent groups.

8. The apparatus of claim 1 wherein a ratio between a radius of the circular forming disk and the width of the depression is between 1.25:1 and 2.75:1.

9. The apparatus of claim 1 comprising:

a cutting device bearing against the side surface of the forming disc and moveable relative to the forming disk.

10. The apparatus of claim 9 wherein the depression has at least one stepless transitional surface adjacent to the portion of the side surface, the transitional surface has an edge line relative to the side surface, and the edge line extends at an incline relative to the directional movement of the cutting device.

11. The apparatus of claim 9 wherein the cutting device has a plurality of ribs each having a cutting edge.

12. The apparatus of claim 11 comprising:

at least one circular reinforcing member connecting the plurality of ribs.

13. The apparatus of claim 9 comprising;

a housing including an inlet and an outlet; and a conveyer configured to convey foodstuff products to the outlet, wherein the forming disk apparatus is arranged at the outlet and is adapted to fill a cross-section of the outlet.

14. The apparatus of claim 1 wherein the forming disk includes a contact surface radially disposed between the central axis and the depression.

* * * * *